United States Patent
Kwon et al.

(10) Patent No.: US 10,923,758 B2
(45) Date of Patent: *Feb. 16, 2021

(54) ELECTRODE ASSEMBLY HAVING STEP, SECONDARY BATTERY, BATTERY PACK AND DEVICE INCLUDING ELECTRODE ASSEMBLY, AND METHOD OF MANUFACTURING ELECTRODE ASSEMBLY

(71) Applicant: LG Chem, Ltd., Seoul (KR)

(72) Inventors: Sung-Jin Kwon, Daejeon (KR); Dong-Myung Kim, Daejeon (KR); Ki-Woong Kim, Daejeon (KR); Soon-Ho Ahn, Seoul (KR)

(73) Assignee: LG Chem, Ltd.

( * ) Notice: Subject to any disclaimer, the term of this patent is extended or adjusted under 35 U.S.C. 154(b) by 135 days.

This patent is subject to a terminal disclaimer.

(21) Appl. No.: 16/135,537

(22) Filed: Sep. 19, 2018

(65) Prior Publication Data
US 2019/0020053 A1 Jan. 17, 2019

Related U.S. Application Data

(63) Continuation of application No. 14/441,727, filed as application No. PCT/KR2013/002147 on Mar. 15, 2013, now Pat. No. 10,128,526.

(Continued)

(30) Foreign Application Priority Data

Feb. 8, 2013 (KR) .................. 10-2013-0014719
Mar. 15, 2013 (KR) .................. 10-2013-0028331

(51) Int. Cl.
*H01M 10/04* (2006.01)
*H01M 2/16* (2006.01)
(Continued)

(52) U.S. Cl.
CPC ......... *H01M 10/0431* (2013.01); *H01M 2/02* (2013.01); *H01M 2/0202* (2013.01);
(Continued)

(58) Field of Classification Search
CPC ......... H01M 10/0431; H01M 10/0445; H01M 10/052; H01M 10/0525; H01M 10/0587;
(Continued)

(56) References Cited

U.S. PATENT DOCUMENTS 5,714,278 A 2/1998 Mallinson
6,387,564 B1 5/2002 Yamashita et al.
(Continued)

FOREIGN PATENT DOCUMENTS

CN 1363121 A 8/2002
JP 2001167743 A 6/2001
(Continued)

OTHER PUBLICATIONS

International Search Report for Application No. PCT/KR2014/001003 dated Apr. 30, 2014.
(Continued)

*Primary Examiner* — Brian R Ohara
*Assistant Examiner* — Rachel L Zhang
(74) *Attorney, Agent, or Firm* — Lerner, David, Littenberg, Krumholz & Mentlik, LLP

(57) ABSTRACT

There is provided an electrode assembly including a first electrode laminate having at least one or more electrode units having a first area, stacked therein, a second electrode laminate having at least one or more electrode units having a second area smaller than the first area, stacked therein, and a step portion provided by stacking the first electrode laminate and the second electrode laminate in a direction perpendicular to a plane and having a step formed due to a difference in areas of the first and second electrode lami- (Continued)

nates, the electrode assembly being characterized in that, the electrode unit is wound by a rectangular-shaped separation film such that at least a portion of the rectangular-shaped separation film covers the step portion of the electrode assembly, and a step having a shape identical to the step portion is formed.

7 Claims, 6 Drawing Sheets

Related U.S. Application Data

(60) Provisional application No. 61/724,615, filed on Nov. 9, 2012.

(51) Int. Cl.
    *H01M 2/02*     (2006.01)
    *H01M 10/0587*     (2010.01)
    *H01M 10/052*     (2010.01)
    *H01M 10/0525*     (2010.01)
    *H01M 2/14*     (2006.01)

(52) U.S. Cl.
    CPC ....... *H01M 2/0237* (2013.01); *H01M 2/0277* (2013.01); *H01M 2/145* (2013.01); *H01M 2/1673* (2013.01); *H01M 10/0445* (2013.01); *H01M 10/052* (2013.01); *H01M 10/0525* (2013.01); *H01M 10/0587* (2013.01); *H01M 2/0267* (2013.01); *H01M 2/0275* (2013.01); *H01M 2220/20* (2013.01); *H01M 2220/30* (2013.01); *Y02T 10/70* (2013.01); *Y10T 29/49108* (2015.01)

(58) Field of Classification Search
    CPC .... H01M 2/02; H01M 2/0202; H01M 2/0237; H01M 2/0267; H01M 2/0275; H01M 2/0277; H01M 2/145; H01M 2/1673
    See application file for complete search history.

(56) References Cited

U.S. PATENT DOCUMENTS

| | | | |
|---|---|---|---|
| 6,709,785 | B2 | 3/2004 | Lee et al. |
| 7,629,077 | B2 | 12/2009 | Bowles et al. |
| 8,815,450 | B1 | 8/2014 | Bates |
| 10,128,526 | B2* | 11/2018 | Kwon ............... H01M 10/0431 |
| 2001/0005561 | A1 | 6/2001 | Yamada et al. |
| 2002/0160257 | A1 | 10/2002 | Lee et al. |
| 2002/0160258 | A1 | 10/2002 | Lee et al. |
| 2003/0013012 | A1 | 1/2003 | Ahn et al. |
| 2004/0038125 | A1 | 2/2004 | Kim et al. |
| 2004/0048150 | A1 | 3/2004 | Crouch et al. |
| 2004/0126654 | A1 | 7/2004 | Sudan et al. |
| 2004/0163235 | A1 | 8/2004 | Feil et al. |
| 2005/0079418 | A1 | 4/2005 | Kelley et al. |
| 2007/0099078 | A1 | 5/2007 | Zhang et al. |
| 2008/0032236 | A1 | 2/2008 | Wallace et al. |
| 2008/0274394 | A1 | 11/2008 | Schormann et al. |
| 2008/0280208 | A1* | 11/2008 | Naoi ................... H01M 10/052 429/247 |
| 2009/0136839 | A1 | 5/2009 | Kraznov et al. |
| 2010/0190081 | A1 | 7/2010 | Park et al. |
| 2012/0015236 | A1 | 1/2012 | Spare |
| 2012/0110836 | A1 | 5/2012 | Oh et al. |
| 2012/0225345 | A1 | 9/2012 | Kim |
| 2013/0004827 | A1 | 1/2013 | Miyazaki et al. |
| 2013/0122350 | A1 | 5/2013 | Hagiwara et al. |
| 2013/0252088 | A1 | 9/2013 | Kuriki et al. |
| 2013/0295436 | A1* | 11/2013 | Kwon ................... H01M 2/266 429/159 |
| 2014/0308570 | A1 | 10/2014 | Gaben et al. |
| 2014/0308571 | A1 | 10/2014 | Gaben et al. |
| 2015/0288021 | A1 | 10/2015 | Kwon et al. |

FOREIGN PATENT DOCUMENTS

| | | |
|---|---|---|
| JP | 2003-132868 A | 5/2003 |
| JP | 2003523061 A | 7/2003 |
| JP | 3680797 B2 | 8/2005 |
| JP | 2015514291 A | 5/2015 |
| KR | 20010104150 A | 11/2001 |
| KR | 20030066960 A | 8/2003 |
| KR | 20080030700 A | 4/2008 |
| KR | 20100118173 A | 11/2010 |
| KR | 20110112241 A | 10/2011 |
| KR | 20120039469 A | 4/2012 |
| KR | 20120116829 A | 10/2012 |

OTHER PUBLICATIONS

International Search Report for Application No. PCT/KR2013/002147 dated Jun. 14, 2013.
Extended Search Report from European Application No. 14725905.5, dated Aug. 10, 2015.
Extended Search Report from European Application No. 13853030.8, dated Sep. 11, 2015.

* cited by examiner

ELECTRODE ASSEMBLY HAVING STEP, SECONDARY BATTERY, BATTERY PACK AND DEVICE INCLUDING ELECTRODE ASSEMBLY, AND METHOD OF MANUFACTURING ELECTRODE ASSEMBLY

CROSS-REFERENCE TO RELATED APPLICATIONS

This application is a continuation of U.S. patent application Ser. No. 14/441,727, filed on May 8, 2015, which is a national phase entry under 35 U.S.C. § 371 of International Application No. PCT/KR2013/002147, filed Mar. 15, 2013, which claims priority to Korean Patent Application No. 10-2013-0028331, filed Mar. 15, 2013, Korean Patent Application No. 10-2013-0014719, filed Feb. 8, 2013, and U.S. Provisional Patent Application No. 61/724,615, filed Nov. 9, 2012, the disclosures of which are incorporated herein by reference.

TECHNICAL FIELD

Aspects of embodiments relate to an electrode assembly having a step, assembled in a stacked and folded scheme, and more particularly, to an electrode assembly in which a separation film formed in a step portion thereof has the same shape as that of the step portion of the electrode assembly, a method of manufacturing the same, a secondary battery, a battery pack and a device including the electrode assembly.

BACKGROUND ART

In general, an electrode assembly having a step has a structure as illustrated in FIG. 1. An electrode assembly 1 having such a step includes an anode or a cathode disposed on both surfaces thereof, as outermost electrodes in a thickness direction of the electrode assembly, that is, a stacking direction thereof.

An electrode assembly having a step as described above is formed by arraying electrodes 7, such as cathode electrodes or anode electrodes, having a difference in areas thereof on a separation film 20 elongated in a single direction, in a predetermined sequence, or by arraying units cells 5 having different areas, formed by stacking a cathode and an anode on each other to have a separation film 20 serving as a boundary therebetween, in a predetermined order, and then folding the separation film to correspond to an electrode unit or unit cell as shown in FIG. 2. Here, the separation film is stretched tight to closely adhere to an electrode surface of a respective electrode or unit cell so as to be flattened thereon, such that the separation film encompasses a previously stacked electrode laminate to continuously allow subsequent electrodes or unit cells to be stacked on an upper surface or a lower surface of the electrode laminate.

Therefore, a step portion having a step formed due to a difference in areas between an electrode having a relatively large area and an electrode having a relatively small area is provided with an inclined surface 10 formed thereon, without closely adhering to side portions formed by electrode laminates stacked on each other, to encompass the previously stacked electrode laminates, as illustrated in FIG. 3.

In the case as described above, a step portion between respective layers may have tension generated in the separation film when an electrode assembly is assembled, and such separation film tension may degrade insertion properties at the time of inserting an electrode assembly into a battery case. In addition, tension generated in the separation film may lead to a defect in a shape of an electrode assembly due to bending occurring in a lower electrode having a large area, as shown in FIG. 4. Accordingly, in an electrode assembly assembled using a stacked and folded scheme, tension generated in a separation film as described above is required to be removed.

DISCLOSURE

Technical Problem

An aspect of an embodiment provides an electrode assembly assembled in a stacked and folded scheme, in which tension generated in a separation film between respective layers formed thereby may be removed.

An aspect of an embodiment provides a secondary battery, a battery pack and a device including an electrode assembly in which tension of a separation film is removed.

An aspect of an embodiment provides a method of removing tension in the electrode assembly as described above.

Technical Solution

An aspect of an embodiment provides an electrode assembly having a step from which tension is removed, the electrode assembly including a first electrode laminate having at least one or more electrode units having a first area, stacked therein, a second electrode laminate having at least one or more electrode units having a second area smaller than the first area, stacked therein, and a step portion provided by stacking the first electrode laminate and the second electrode laminate in a direction perpendicular to a plane and having a step formed due to a difference in areas of the first and second electrode laminates, the electrode assembly being characterized in that the electrode unit is wound by a rectangular-shaped separation film such that at least a portion of the rectangular-shaped separation film covers the step portion of the electrode assembly, and a step having a shape identical to the step portion is formed.

The separation film covering the step portion of the electrode assembly may have a thickness equal to 90% or less of a thickness of the rectangular-shaped separation film located in the electrode laminate, by winding the electrode unit, and may be cut.

The second electrode laminate may include an electrode laminate having at least one electrode unit having an area smaller than the second area, stacked on at least one electrode unit having the second area, in a direction perpendicular to the plane and may include at least one step.

The electrode unit may include at least one selected from a group configured of a single electrode; at least one unit cell including at least one anode, at least one cathode and at least one separation film; and a combination thereof. The unit cell may be selected from a group configured of a jelly-roll type unit cell, a stacked type unit cell, a laminated and stacked type unit cell and a stacked and folded type unit cell. The unit cell may include electrodes having the same polarity or different polarities and disposed on both outermost surfaces thereof in a thickness direction of the electrode assembly.

The electrode units may include at least one electrode tab. The electrode tabs may have electrodes having the same polarity to be electrically connected to each other. The electrode tabs may have the same size or different sizes depending on an area of the electrode unit.

An uppermost electrode of the first electrode laminate may be a cathode, and the first electrode laminate and the second electrode laminate may be formed by stacking electrodes having different polarities to face each other.

An aspect of an embodiment provides a method of manufacturing an electrode assembly including: arraying at least one first electrode unit having a first area forming a first electrode laminate, and at least one second electrode unit having a second area forming a second electrode laminate on a rectangular-shaped separation film, and assembling the electrode assembly having a step due to a difference in areas between the electrode laminates by rolling the rectangular-shaped separation film up in a single direction to correspond to the respective electrode unit so as to allow the second electrode laminate to be stacked on the first electrode laminate; and removing tension generated on an inclined surface of the rectangular-shaped separation film formed through a passing-by thereof, by elongating or cutting the rectangular-shaped separation film on the inclined surface thereof between a distal end portion of the second electrode unit and a distal end portion of an uppermost first electrode unit of the first electrode laminate, on one side portion of the electrode assembly through which the rectangular-shaped separation film is passed and in which the step is formed.

The elongating may be performed by heating and compressing the rectangular-shaped separation film forming the inclined surface, and in this case, the elongating may be performed at a temperature ranging from 80 to 100° C.

The elongating may be performed by compressing the rectangular-shaped separation film forming the inclined surface using a jig having the temperature ranging from 80 to 100° C. In this case, the jig may have the same shape as the step portion of the electrode assembly.

The cutting may be performed using a cutting blade, a laser beam or a heat ray.

An aspect of an embodiment provides a secondary battery including the electrode assembly described above. The electrode assembly may be embedded in a battery case. In this case, the battery case may be a pouch-type case. In addition, the secondary battery may be a lithium ion secondary battery or a lithium ion polymer secondary battery.

An aspect of an embodiment provides a battery pack including at least two secondary batteries described above.

An aspect of an embodiment provides a device including at least one secondary battery described above, and the device may be a mobile phone, a portable computer, a smartphone, a smartpad, a netbook computer, a light electric vehicle, an electric vehicle, a hybrid electric vehicle, a plug-in hybrid electric vehicle, or a power storage device.

Advantageous Effects

As set forth above, in an electrode assembly having a step according to an embodiment of the inventive concept, when an electrode assembly having a step is assembled in a stacked and folded scheme, tension generated in a separation film, between respective layers, may be removed, whereby insertion properties of an electrode assembly at the time of inserting the electrode assembly into a battery case may be improved, and bending of a lower electrode laminate may be suppressed at the time of a compressing process, thereby preventing a defect in an appearance of an electrode assembly.

DESCRIPTION OF DRAWINGS

The above and other aspects, features and other advantages will be more clearly understood from the following detailed description taken in conjunction with the accompanying drawings, in which.

MODE FOR INVENTION

Hereinafter, embodiments will now be described in detail with reference to the accompanying drawings.

Embodiments may, however, be embodied in many different forms and should not be construed as being limited to embodiments set forth herein. Rather, these embodiments are provided so that this disclosure will be thorough and complete, and will fully convey the scope of the inventive concept to those skilled in the art.

Figure 1:
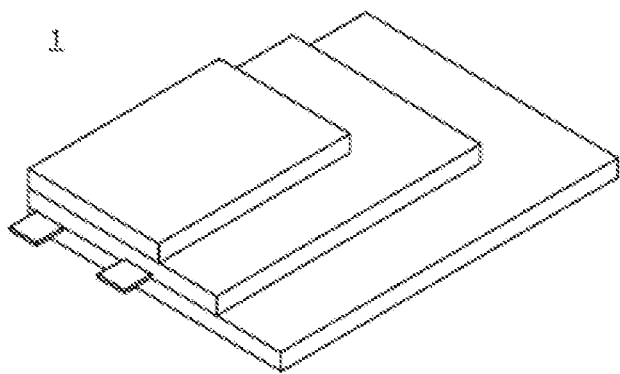
FIG. 1 is a schematic perspective view of an electrode assembly having a step.

An electrode assembly according to an embodiment may include a first electrode laminate having at least one or more electrode units having a first area, stacked therein, a second electrode laminate having at least one or more electrode units having a second area smaller than the first area, stacked therein, and a step formed by stacking the first electrode laminate and the second electrode laminate in a direction perpendicular to a plane as shown in FIG. 1.

Figure 5:
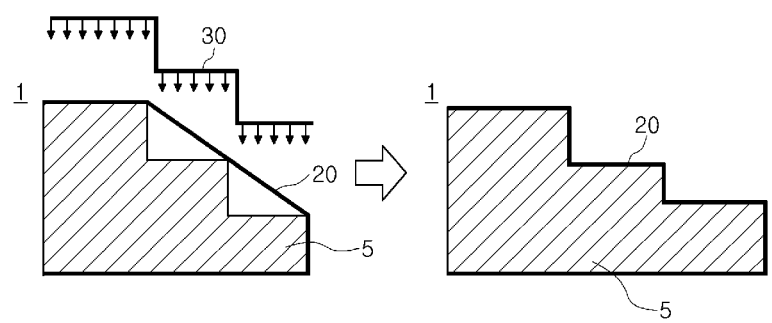
FIGS. 5 and 6 are a schematic concept diagram illustrating a method of removing tension generated in a separation film using a jig press according to an embodiment of the inventive concept and a cross-sectional view of an electrode assembly including a separation film having a step formed thereby.
Figure 6:
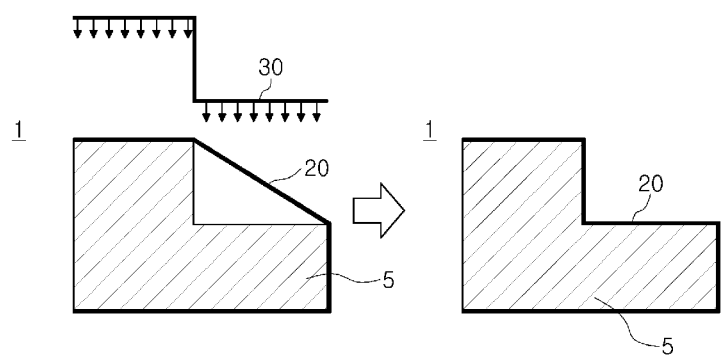
Figure 7:
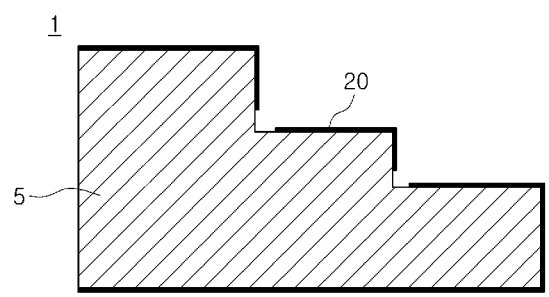
FIGS. 7 and 8 schematically show an electrode assembly including a separation film having a step formed by cutting the separation film.
Figure 8:
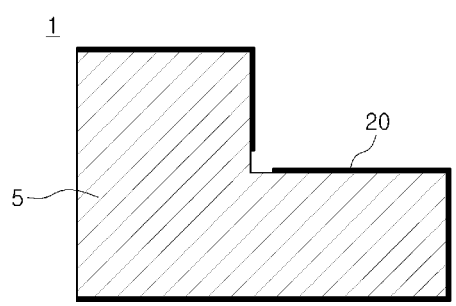

Here, the number of steps is not particularly limited, and may be three steps 30 as shown in FIGS. 1, 5 and 7, or may be two steps 30 as shown in FIGS. 6 and 8. Also, although not shown in the drawing, four or more steps 30 may be provided.

Meanwhile, according to an embodiment, a respective electrode unit may be configured of a single electrode such as a cathode or an anode; at least one unit cell including at least one cathode, at least one anode and at least one separation film; or a combination thereof.

Here, the term 'unit cell' refers to all electrode laminates including at least one cathode, at least one anode and at least one separation film. A method of stacking a cathode, an anode and a separation film in a unit cell is not particularly limited. For example, in an embodiment of the inventive concept, the term 'unit cell' may be used to refer to all electrode laminates including: an electrode laminate manufactured in a jelly-roll scheme in which a sheet-type cathode and a sheet-type anode are partitioned by a separation film and then helically rolled up; an electrode laminate manufactured in a stacked scheme in which at least one cathode, at least one separation film, and at least one anode are sequentially stacked; and an electrode laminate manufactured in a stacked and folded scheme in which electrode laminates having a single electrode and at least one anode, a separation film and a cathode stacked therein or having a single electrode or at least one anode, a separation film and a cathode stacked therein are disposed on a lengthily elongated sheet-type separation film and are then folded.

Meanwhile, in the embodiment, the unit cells may have a structure in which electrodes disposed on both outermost surfaces of a unit cell in a thickness direction of an electrode assembly have the same polarity as each other such as in a structure such as that of an anode/a separation film/a cathode/a separation film/an anode, a structure of a cathode/a separation film/an anode/a separation film/a cathode, or the like, or may also have a structure in which electrodes disposed on both outermost surfaces of a unit cell in the thickness direction of the electrode assembly have different polarities such as in a structure of an anode/a separation film/a cathode or a structure of an anode/a separation film/a cathode/a separation film/an anode/a separation film/a cathode.

On the other hand, in an embodiment of the inventive concept, the electrode laminate manufactured using the stacked scheme as described above should be understood to be an electrode laminate manufactured in a scheme in which at least one anode, at least one cathode and at least one separation film are laminated to form electrode bodies after which the electrode bodies are stacked (hereinafter, referred to as 'laminated and stacked scheme') as well as an electrode laminate manufactured using a typical scheme in which one anode, one separation film and one cathode are respectively sequentially stacked.

Meanwhile, when an electrode laminate is manufactured in the laminated and stacked scheme, any electrode body including at least one anode, at least one cathode and at least one separation film may be used and a configuration thereof is not particularly limited.

However, when the electrode laminate is manufactured in the laminated and stacked scheme, the electrode body may have a basic structure configured of a first electrode/a separation film/a second electrode/a separation film or a separation film/a first electrode/a separation film/a second electrode, in terms of process simplicity and economic feasibility. Here, the first electrode and the second electrode may have different polarities, that is, an anode or a cathode. The electrode body may include a single basic structure or a plurality of basic structures.

Meanwhile, the electrode laminate manufactured in the laminated and stacked scheme may only be configured of an electrode body including the basic structure described above and may also be configured of an electrode body having the basic structure described above and an electrode structure having a different structure.

Figure 10:
FIGS. 10 to 12 illustrate embodiments of a laminated and stacked type unit cell according to an embodiment.
Figure 11:
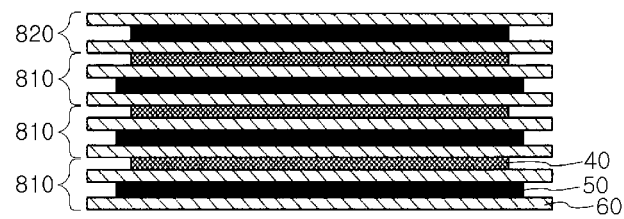
Figure 12:
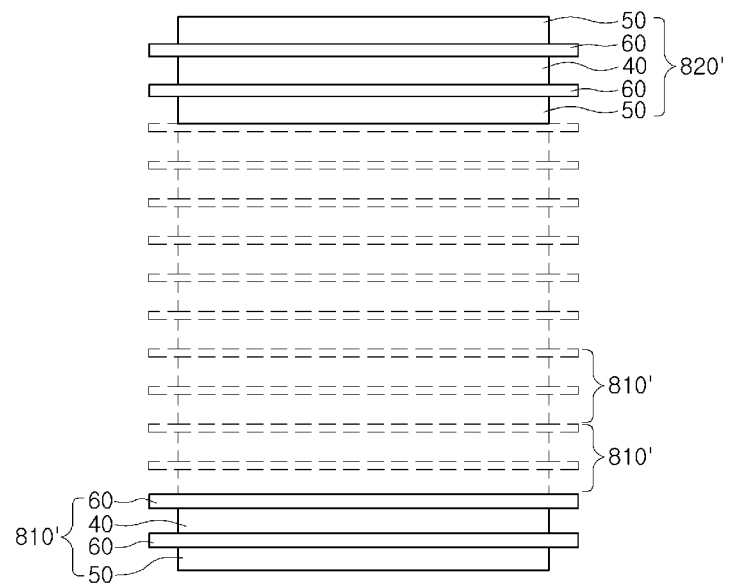

FIGS. 10 to 12 illustrate various examples of electrode laminates manufactured using a laminated and stacked scheme.

FIG. 10 illustrates an electrode laminate manufactured in the laminated and stacked scheme, configured of electrode bodies 710 having a basic structure of a separation film 60/a cathode 50/a separation film 60/an anode 40. In FIG. 10, although the basic structure having a separation film/a cathode/a separation film/an anode is illustrated, a basic structure of a separation film/an anode/a separation film/a cathode provided by changing locations in which the anode and the cathode are positioned may also be used. Meanwhile, as shown in FIG. 10, when the basic structure of the electrode body is the structure including a separation film/a cathode/a separation film/an anode, the anode is exposed without a separation film on an outermost portion of the electrode laminate in the thickness direction of the electrode assembly. In a case in which such a basic structure is used, the anode exposed to the outermost portion in the thickness direction may be a single surface coated anode in which an exposed surface thereof is not coated with an active material, used at the time of designing of an electrode in consideration of capacity and the like. On the other hand, although FIG. 10 illustrates the case in which the electrode bodies have a single basic structure, the inventive concept should not be considered to be limiting. For example, a structure in which two or more basic structures are repeatedly stacked on each other may also be used as a single electrode body.

FIG. 11 illustrates an electrode laminate in which electrode bodies 810 having a basic structure of a separation film 60/a cathode 50/a separation film 60/an anode 40 and an electrode structure 820 having a structure of a separation film 60/a cathode 50/a separation film 60 are stacked on each other. As illustrated in FIG. 11, when the electrode structure having the structure of the separation film 60/the cathode 40/the separation film 60 is stacked on an outermost surface of a unit cell in the thickness direction of the electrode assembly, electrical capacitance may be increased while preventing the anode 50 from being exposed to the outside. Similar to the description above, in the case of an array in which a cathode is located on an outermost portion of the electrode body in the thickness direction of the electrode assembly, an electrode structure having a structure of a separation film/an anode/a separation film may be stacked on an upper part thereof. This case may exhibit an advantage in that a cathode capacity may be significantly used.

FIG. 12 illustrates an electrode laminate in which electrode bodies 810' having a basic structure of a cathode 50/a separation film 60/an anode 40/a separation film 60 and an electrode structure 820' having a structure of a cathode 50/a separation film 60/an anode 40/a separation film 60/a cathode 50 are stacked on each other. As illustrated in FIG. 12, when the electrode structure 820' having the structure of the cathode 50/the separation film 60/the anode 40/the separation film 60/the cathode 50 is stacked on an outermost surface of the electrode laminate in a thickness direction of an electrode assembly, electrical capacitance may be increased while preventing the anode from being exposed to the outside.

As illustrated in FIGS. 11 and 12, the electrode laminates manufactured using the laminated and stacked scheme may be formed by combining a single electrode, a separation film, or unit cells having arrays and configurations different from those of the above-mentioned electrode bodies, together with the electrode bodies having the basic structure as described above. Specifically, when the electrode bodies having the basic structure are stacked on one another, in the light of at least one of preventing an anode from being exposed to the outside and increasing battery capacity, a single electrode, a single surface coated electrode, a separation film or unit cells having arrays and configurations different from those of the electrode bodies described above may be disposed on at least one selected from one outermost surface and both outermost surfaces of the electrode laminate in the thickness direction of the electrode laminate. On the other hand, FIGS. 11 and 12 illustrate that the electrode structure having a different structure is stacked on the electrode laminate, but should not be considered to be limited thereto. For example, an electrode structure having a different structure may also be stacked below the electrode laminate, and electrode structures having different structures may also be stacked on both of upper and lower parts thereof, as needed.

Meanwhile, according to an embodiment of the present inventive concept, the term 'stacked and folded scheme' commonly refers to a scheme in which electrode laminates including a single electrode, at least one anode, at least one separation film and at least one cathode stacked therein, or a single electrode, or at least one anode, at least one separation film and at least one cathode stacked therein, are disposed on a lengthily elongated sheet-type separation film, and are then folded. The folded scheme is not particularly limited and should be understood to include various folded schemes. That is, well-known and various folded schemes may be used. For example, a scheme in which a sheet-type separation film is folded in a zigzag manner (called a Z-folding type scheme or a screen folding type scheme), a scheme in which electrode laminates including at least one cathode and at least one anode having a separation film interposed therebetween, stacked on each other, are disposed on one surface of a sheet-type separation film, and the sheet-type separation film is then rolled up, a scheme in which single electrodes are alternately disposed on both surfaces of a sheet-type separation film and the sheet-type separation film is then rolled up, or the like, may be used. For convenience of description, in embodiments of the inventive concept, a unit cell manufactured in a jelly-roll scheme will refer to a jelly-roll type unit cell, a unit cell manufactured in a stacked scheme will refer to a stacked type unit cell, and a unit cell manufactured in a stacked and folded scheme will refer to a stacked and folded type unit cell.

The electrode assembly according to an embodiment may be formed by stacking a first electrode laminate and a second electrode laminate on each other, the second laminate be formed on the first electrode laminate. Here, as described above, the first electrode laminate may be formed of an electrode unit having a first area, and the second electrode laminate may be formed of an electrode unit having a second area smaller than the first area. Electrodes configuring respective electrode laminates may have a difference in areas thereof, and a step may be formed by the area difference as described above, thereby providing a step portion.

Although the second electrode laminate may not have a step by stacking electrode units having the same area on one another therein, at least one electrode laminate having an area smaller than the second area may be stacked thereon to have at least one step provided therewith. In this case, the electrode laminate stacked on the second electrode laminate may have a structure in which areas thereof are reduced sequentially in a direction perpendicular to a plane.

The electrode laminate may be formed by alternately stacking a cathode and an anode to have a separation film interposed as a boundary therebetween. On the other hand, a cathode and an anode may be stacked to face each other at a boundary portion therebetween forming a step between respective electrode laminates stacked on each other. As such, different electrodes face each other such that battery capacity may also be exhibited in the boundary portion at which the step is formed, thereby increasing battery capacity. Here, specifically, as an outermost electrode of the first electrode laminate having a relatively large area, that is, the first area, at the boundary portion forming the step, in a thickness direction of the electrode assembly; an electrode facing the second electrode laminate having a relatively small area, that is, the second area, may be a cathode. When an anode is disposed as an outermost electrode of the first electrode laminate in the thickness direction of the electrode assembly, an anode active material, that is, lithium may be precipitated during charging and discharging of a battery to thus hinder battery stability. Therefore, when a cathode and an anode face each other at the boundary portion having a step provided therewith, an electrode having a relatively large area may be a cathode.

Figure 3:
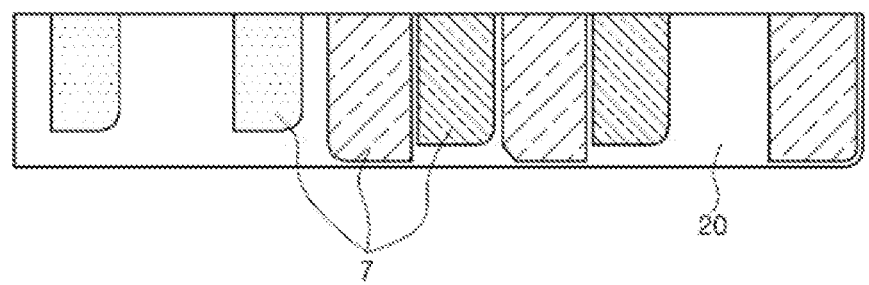
FIG. 3 is a schematic view illustrating a generation of tension due to a separation film in an electrode assembly assembled in a stacked and folded scheme.

The electrode assembly according to an embodiment may be assembled using a stacked and folded scheme. As shown in FIG. 3, electrode units may be arrayed on a rectangular-shaped separation film to be rolled up such that an electrode assembly may have a step due to the roll-up. That is, the rectangular-shaped separation film may be rolled up for respective electrode units, thereby forming the electrode assembly.

A material of the rectangular-shaped separation film is not particularly limited. Any general material for a separation film may be used to be appropriate to an embodiment. For example, a multilayer film manufactured using polypropylene, polyethylene having a fine porous structure, or a combination thereof, or a polymer film for a solid polymer electrolyte or a gel-type polymer electrolyte such as polyvinylidene fluoride, polyethylene oxide, polyacrylonitrile or polyvinylidene fluoride hexafluoropropylene copolymer may be used.

When the electrode assembly is assembled using the rectangular-shaped separation film as described above through the stacked and folded scheme, at least one first electrode unit having the first area forming the first electrode laminate, and at least one second electrode unit having the second area forming the second electrode laminate may be arrayed on the rectangular-shaped separation film, and the arrayed respective electrode units may be folded and rolled up in a single direction while being encompassed by the separation film. The rectangular-shaped separation film may encompass an external part of the previously formed electrode laminate while facing one surface of the electrode laminate. Here, the respective electrode units may face each other, having the rectangular-shaped separation film interposed as a boundary therebetween, such that the respective electrode units are stacked on one another so as to stack a single electrode unit on one surface of the previously formed electrode laminate and subsequently stack a different electrode unit on another surface of the electrode laminate, opposed thereto.

Figure 2:
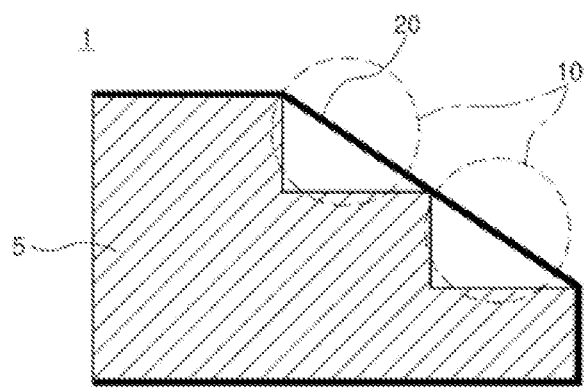
FIG. 2 is an example of a development view of an electrode unit in which electrode units are arrayed on a rectangular-shaped separation film when an electrode assembly having a step is assembled in a stacked and folded scheme.

Therefore, the rectangular-shaped separation film may also encompass a step portion having a step formed due to a difference in areas between the first electrode laminate having electrode laminates stacked therein having the first area and the second electrode laminate having electrode laminates stacked therein having the second area, thereby forming an electrode assembly having a step. Here, the rectangular-shaped separation film 20 passed through one side portion of the electrode assembly having the step formed thereon may form an inclined surface 10 between the respective electrode unit of the second electrode laminate and an uppermost electrode unit of the first electrode laminate as illustrated in FIG. 2. The inclined surface 10 may be provided by applying tension to the separation film to be rolled up such that the separation film may be flat on surfaces of respective electrode units to be closely adhered thereto while the respective electrode units face each other when the electrode assembly is assembled. Thus, a step between the respective electrode units stacked on each other may not be exhibited as it is in the step portion having the step in the electrode assembly.

Tension generated in the separation film represented at the step portion as above may degrade insertion properties at the time of inserting the electrode assembly into a battery case, and bending may occur due to tension generated in a lower layer of the electrode assembly, such that a defective external appearance of the electrode assembly may be generated. Therefore, the removal of tension from the inclined surface as described above may be required. The removal of tension from the inclined surface may be altered, depending on a material forming the separation film and may be performed by elongating or cutting the rectangular-shaped separation film.

In the case of elongation or cutting process as described above, as shown in FIGS. 5 to 8, the generation of tension in the inclined surface may be prevented by elongating or cutting the rectangular-shaped separation film on the inclined surface between a distal end portion of the second electrode unit and a distal end portion of an uppermost first electrode unit of the first electrode laminate, that is, between a distal end portion of the second electrode unit and a distal end portion of the uppermost first electrode unit of the first electrode laminate. That is, the elongation or cutting process may be performed on the rectangular-shaped separation film provided with the inclined surface disposed on one side portion of the electrode assembly through which the rectangular-shaped separation film is passed and in which the step is formed, thereby preventing the generation of tension.

The rectangular-shaped separation film may be elongated to be changed to have the same form as that of the step portion, such that the separation film has the same step as that of the electrode assembly. The elongation may be performed by applying pressure to the rectangular-shaped separation film while heating the rectangular-shaped separation film. Here, a heating temperature thereof may be varied depending on a material forming the separation film, and the heating may be performed at a temperature ranging from 80 to 100° C. For example, as shown in FIG. 5, the separation film may be compressed using a jig heated within the range of temperature as described above to thereby perform the elongation. In this case, the jig having a step of the same shape as that of the step portion of the electrode assembly may be used. Tension generated on the inclined surface may be removed by forming a step having the same shape as that of the step portion in the separation film through the heating and elongation as described above.

A thickness of the elongated portion of the separation film due to the heating and compression as described above may be reduced by the elongation. An elongated extent may be varied depending on an altitude difference in the step portion, and an amount of reduction in a thickness of the separation film may be changed thereby. Thus, the elongated portion of the separation film may be 90% or less as compared to a portion in which the elongation is not performed, for example, a thickness of a portion of the separation film in which the electrode unit is folded and is located within the electrode laminate, but the inventive concept should not be considered to be limiting. As described below, the separation film may be fractured due to excessive elongation, due to the heating and compression processes as described above, and in this case, a thickness of a fractured portion of the separation film may be 0% as compared to that of a portion of the separation film in which the elongation is not performed.

Meanwhile, in order to remove tension generated on the inclined surface, the inclined surface may be fractured according to an elongation applied to the separation film or may be intentionally cut. That is, the occurrence of tension may be prevented by cutting the rectangular-shaped separation film having the inclined surface formed by tension in a portion thereof corresponding to the step portion. The separation film generally has a significantly thin thickness and may be closely adhered to respective surfaces of the step portion of the electrode assembly by removing tension generated therein. Whereby, the separation film may be implemented to have a shape corresponding to that of the step portion of the electrode assembly.

The cutting process is not particularly limited and may be performed through various methods. For example, the cutting process may be performed using, for example, a cutting blade, a laser beam, a heat ray, or the like, but should not be understood to be limiting. In addition, a cutting line may be formed in a position of a portion of the separation film to be cut, and the separation film may then be compressed or compressed simultaneously with being heated so as to lead to cutting of the separation film at the cutting line. As such, by cutting the separation film, tension of the separation film having formed the inclined surface on the step portion may be removed such that the separation film may be closely adhered to respective surfaces of the electrode assembly as shown in FIGS. 7 and 8. Whereby, a step of the electrode assembly may be implemented to be directed outwardly.

Figure 9:
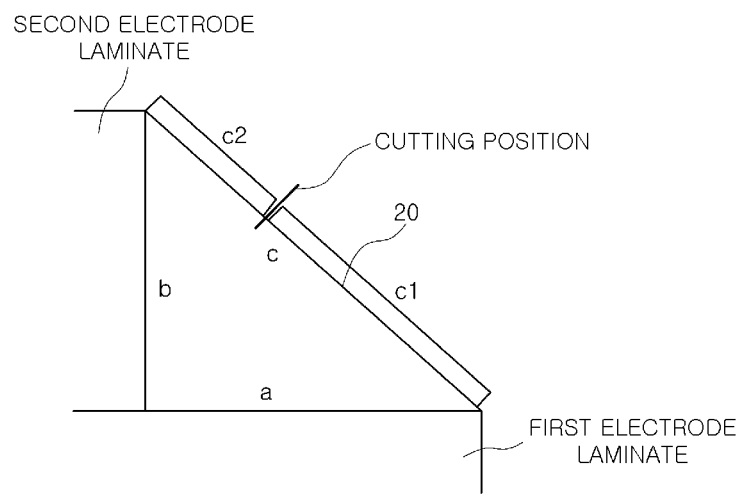
FIG. 9 schematically illustrates a step portion in which a separation film forms an inclined surface in an electrode assembly having a step.

In this case, a position at which the cutting process is performed is not particularly limited. With reference to FIG. 9 showing a cross section of the electrode assembly, the step portion may include a horizontal line a, that is, a surface exposed to the outside, without facing the second electrode laminate, as an outermost surface of the first electrode laminate in a thickness direction of the electrode assembly; and a vertical line b, that is, an end surface of the second electrode laminate formed by stacking electrode units having the second area, in a length direction of the electrode assembly. The step portion may also form a right-angled triangle with a right angle formed by the horizontal line a, the vertical line b and a hypotenuse c of the inclined surface of the separation film, that is, a side of the right angle. Therefore, the inclined surface c may be cut at a necessary position thereof. As such, by performing the cutting process, tension of the separation film having the tension applied thereto may be removed, a cut separated film c1 as described above may be closely adhered to the horizontal line a, and a separated film c2 may be closely adhered to the vertical line b. In this case, when a length of the cut separated film c1 or c2 is greater than that of the horizontal line a or the vertical line b ((c1>a or c2>b) to which the separated film is closely adhered, the separated film may be folded. Therefore, the cutting process maybe performed such that the length of the cut separated film, that is, the length of c1 or c2 may not exceed the length of the horizontal line a or the vertical line b. That is, the cutting may be performed to satisfy the condition of c1≤a or c2≤b.

Figure 4:
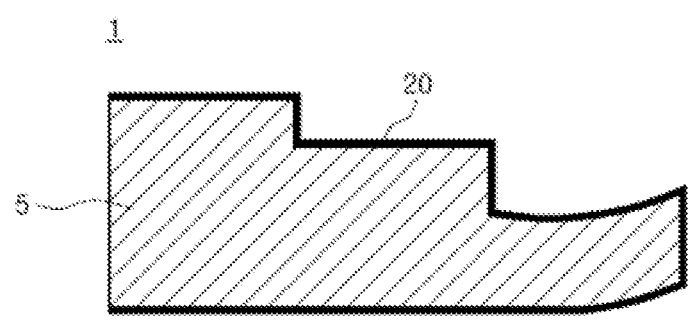
FIG. 4 is a schematic concept diagram illustrating a form in which an electrode laminate is bent by tension of a separation film.

According to the embodiment as described above, an electrode assembly having a step formed by the electrode units having a difference in areas thereof, stacked on each other, as it is may be achieved using a separation film during manufacturing of the electrode assembly. In addition, difficulties in accommodating the electrode assembly in a battery case due to tension generated in the separation film may be eliminated and the occurrence of bending in the lower electrode laminate as illustrated in FIG. 4 may be prevented.

Meanwhile, in the electrode assembly according to the embodiment, the electrode units may include at least one electrode tab. When the electrode unit is configured of a single electrode, only a single electrode tab may be provided, and when the electrode unit is configured to include a unit cell, a cathode tab and an anode tab may both be generally provided. In the case of the electrode tabs described above, electrodes having the same polarity may be electrically connected to each other. On the other hand, in the embodiment, the areas of the electrode tabs or positions in which the electrode tabs are arrayed are not particularly limited. In addition, in order to protect the electrode tabs or expose greater amounts of the electrode tabs to the outside, taping may also be performed on portions of the electrode tabs.

Meanwhile, in the embodiment, the electrode tabs provided with respective electrode units may have the same area as or areas different from each other. Since the areas of electrode units included in the electrode assembly according to the related art are identical to each other, the electrode tabs having the same area are generally used. However, in the embodiment of the present inventive concept, since two or more types of electrode units having different areas are included in the electrode assembly, the size of an electrode tab applied to be suitable for a respective electrode unit may be different. Therefore, in the electrode assembly according to the embodiment of the inventive concept, an electrode tab having a different area depending on the area of an electrode unit may be selectively used to thereby significantly increase electrical capacitance.

In addition, according to the embodiment, the electrode tabs may be disposed in various locations, for example, such that the electrode tabs having the same polarity are partially or entirely overlapped with each other. In the case of the electrode assembly according to the related art, in order to facilitate electrical connection of the electrode tabs after insertion into a battery case, the electrode tabs having the same polarity were generally disposed to be entirely overlapped with each other. However, in this case, when the number of stacked electrode layers is increased, thicknesses of the electrode tabs may be increased and bonding properties between the electrode tabs may be deteriorated. Such a defect may be significantly reduced by disposing the electrode tabs to be partially overlapped with each other, other than disposing the electrode tabs to be entirely overlapped with each other.

Specifically, as in the electrode assembly according to the embodiment, when two or more types of electrode units having different areas are used, electrode tabs having different areas depending on areas of the electrode units may be used, and the electrode units may be arrayed such that the electrode tabs are partially overlapped with each other, thereby improving bonding properties between electrode tabs while significantly increasing electrical capacitance.

A battery cell of a lithium ion secondary battery or a lithium ion polymer secondary battery may be manufactured using the electrode assembly according to an embodiment of the inventive concept. The electrode assembly may be embedded in a battery case and the battery case may be a pouch-type battery case. Here, the battery case having a step portion previously formed during a pouch forming process depending on a shape of the electrode assembly to be embedded therein may be used.

On the other hand, the pouch-type case may be configured of a laminate sheet, and in this case, the laminate sheet may include an outer resin layer forming an outermost portion in a thickness direction thereof, a metal blocking layer preventing penetration of a material, and an inner resin layer for sealing, but should not be considered to be limiting.

In addition, the battery case may have a structure in which an electrode lead to electrically connect electrical terminals of electrode units of the electrode assembly to each other is exposed to the outside, and although not shown in the drawing, insulating films for protecting the electrode lead may be attached to upper and lower surfaces of the electrode lead.

Further, the battery case may have a shape corresponding to that of the electrode assembly according to the embodiment. The shape of the battery case as described above may be formed in such a manner as changing the battery case itself. In this case, the shape and size of the battery case may not necessarily completely coincide with those of the electrode assembly, and thus, any shape and size able to prevent internal short circuits due to a slip phenomenon of the electrode assembly may be used. On the other hand, the shape of the battery case according to an embodiment should not be considered to be limiting, and battery cases having various shapes and sizes may be used as required.

Moreover, a battery pack including two or more battery cells having an electrode assembly according to an embodiment of the inventive concept may be obtained, and further, a device including at least one or more battery cells according to the embodiment may be implemented. The device may be a mobile phones, a portable computer, a smartphone, a smartpad, a netbook computer, a light electric vehicle, an electric vehicle, a hybrid electric vehicle, a plug-in hybrid electric vehicle, or a power storage device.

While the inventive concept has been shown and described in connection with embodiments, it will be apparent to those skilled in the art that modifications and variations can be made without departing from the spirit and scope of the present inventive concept as defined by the appended claims.

The invention claimed is:

1. An electrode assembly including a first electrode laminate having at least one or more electrode units having a first area, stacked therein, a second electrode laminate having at least one or more electrode units having a second area smaller than the first area, stacked therein, and a step portion provided by stacking the first electrode laminate and the second electrode laminate in a direction perpendicular to a plane and having a step formed due to a difference in areas of the first and second electrode laminates, the electrode assembly being characterized in that, the at least one or more electrode units of the first electrode laminate and the second electrode laminate are wound and surrounded by a rectangular-shaped separation film such that at least a portion of the rectangular-shaped separation film covers the step portion of the electrode assembly, the rectangular-shaped separation film initially having a constant thickness when wound around the at least one or more electrode units of the first electrode laminate and the second electrode laminate, wherein the rectangular-shaped separation film forms a separator step having a shape identical to the step portion, and wherein the rectangular-shaped separation film covering the step portion of the electrode assembly is elongated while being wound so as to result in a reduced thickness equal to 90% or less of the constant thickness of the rectangular-shaped separation film located in the first and the second electrode laminates.

2. The electrode assembly of claim 1, wherein the second electrode laminate has at least one electrode unit having an area smaller than the second area, stacked on at least one electrode unit having the second area, in a direction perpendicular to the plane, and includes at least one step.

3. The electrode assembly of claim 1, wherein the at least one or more electrode units of the first electrode laminate and the second electrode laminate each include a single electrode; at least one unit cell including at least one anode, at least one cathode and at least one separation film; or a combination thereof, wherein the unit cell of the first electrode laminate and the second electrode laminate includes electrodes having the same polarity and disposed on both outermost surfaces thereof in a thickness direction of the electrode assembly.

4. The electrode assembly of claim 1, wherein an uppermost electrode of the first electrode laminate is a cathode.

5. The electrode assembly of claim 1, wherein the electrode assembly is configured of two layers.

6. The electrode assembly of claim 1, wherein the electrode assembly is configured of three or more layers.

7. The electrode assembly of claim 1, wherein the electrode assembly has a top surface and a bottom surface, the top surface and bottom surface being parallel with the step, and wherein the rectangular-shaped separation film covers both the top surface and the bottom surface of the electrode assembly.

* * * * *